United States Patent [19]

Woodbridge

[11] 4,260,901
[45] Apr. 7, 1981

[54] WAVE OPERATED ELECTRICAL GENERATION SYSTEM

[76] Inventor: David D. Woodbridge, 9190 Red Branch Rd., Columbia, Md.

[21] Appl. No.: 15,242

[22] Filed: Feb. 26, 1979

[51] Int. Cl.³ .......................... F03B 13/12; E02B 9/08
[52] U.S. Cl. ....................................... 290/42; 290/53; 417/331
[58] Field of Search ................................. 290/42, 53; 417/330–337, 341, 343

[56] References Cited

U.S. PATENT DOCUMENTS

| | | | |
|---|---|---|---|
| 1,244,309 | 10/1917 | Fox | 290/53 X |
| 3,011,062 | 11/1961 | Goldsmith | 290/53 |
| 3,965,365 | 6/1976 | Parr | 290/42 X |
| 4,060,344 | 11/1977 | Ootsu | 417/330 |

Primary Examiner—J. V. Truhe
Assistant Examiner—W. E. Duncanson, Jr.

Attorney, Agent, or Firm—Duckworth, Hobby, Allen & Pettis

[57] ABSTRACT

A system for converting the mechanical energy in the wave motion of a body of water into electrical energy. A frame is fixed with respect to the wave motion of the water. A flotation element is buoyantly supported by the water and constrained to follow only the vertical component of the wave motion. The motion of the flotation element is transferred to an electrical generating device which includes a device for producing electromagnetic flux and electrical coils. The motion of the flotation element causes relative motion between the flux-producing device and the electrical coils thereby generating an electromotive force. A positioning subsystem is provided for moving the electrical generating device relative to the flotation element when the average depth of the body of water changes so as to maintain a symmetrical relative motion between the flux-producing device and the electrical coils.

10 Claims, 4 Drawing Figures

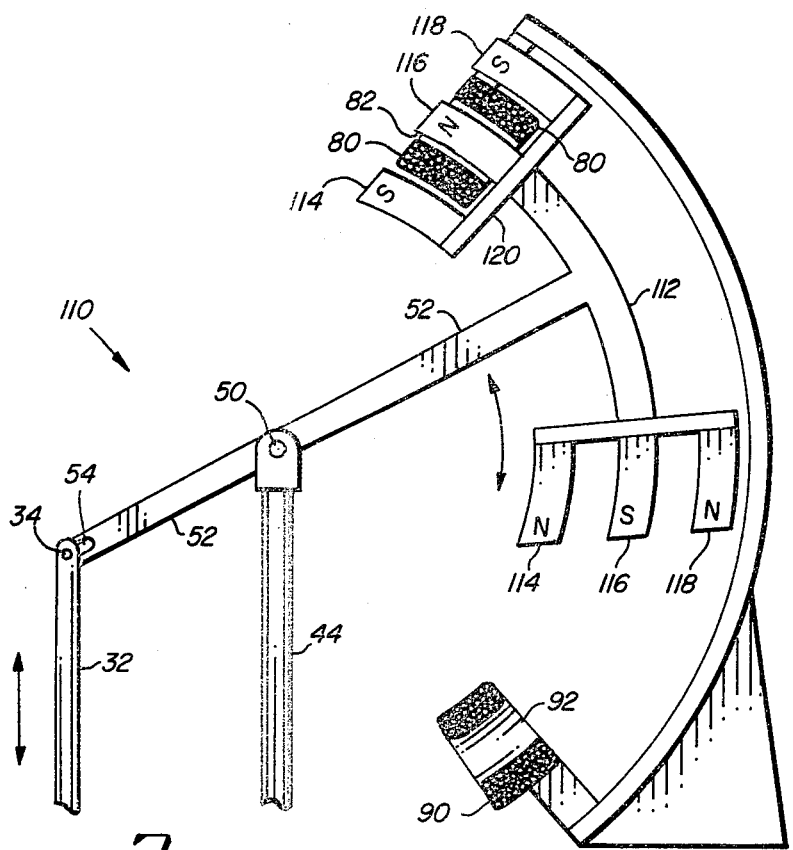
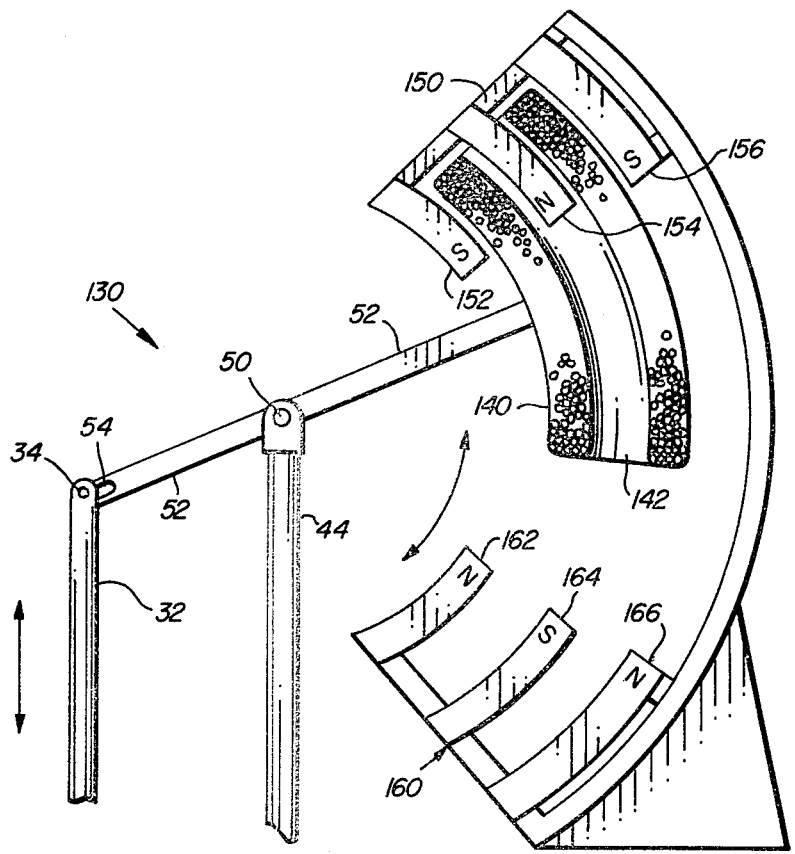

4,260,901

WAVE OPERATED ELECTRICAL GENERATION SYSTEM

BACKGROUND OF THE INVENTION

1. Field of the Invention

The present invention relates to systems for utilizing the energy in ocean waves and the like, and in particular to apparatus for converting such wave energy into electrical energy.

2. Description of the Prior Art

Several schemes have been devised in the prior art for converting the wave motion energy of a body of water into electrical energy. One scheme uses wave motion energy of tidal differences to raise water in a reservoir; the water in the reservoir is then used to drive a turbine. See, for example, U.S. Pat. Nos. 2,668,918; 2,820,148; 2,871,790; and 3,487,228. A second scheme utilizes wave motion energy to pump or compress air or water which, in turn, drives a turbine. See, for example, U.S. Pat. Nos. 427,398; 901,117; 3,569,725; 3,064,137; and 3,200, 255. A third scheme utilizes the periodic motion of the waves to rotate various gears which in turn drive an electrical generator. See, for example, U.S. Pat. Nos. 3,204,110 and 3,231,749. The fourth scheme employs the horizontal vector element of wave motion energy to turn a shaft which then drives a turbine. See, for example, U.S. Pat. Nos. 833,361; 988,508; and 1,289,533. The fifth arrangement utilizes the energy in the differential height of the tide to drive a gear arrangement, or to provide the differential motion between magnets and fields coils. See, for example U.S. Pat. Nos. 3,011,062 and 3,567,953.

A further technique employs two concentric buoys; a first buoy is anchored and maintains a fixed position, while the second buoy is buoyantly supported by, and moves with, the wave motion on the surface of the body of water. A magnet is mounted in one buoy and a field coil is mounted in the other, so that the relative motion between the buoys generates an electromotive force. This technique is disclosed by Rich in U.S. Pat. No. 3,546,473.

An early U.S. Pat. No. 628,457 to Gehre discloses a rudimentary wave generator, which uses single induction coils on a small, floating system. The floating system has the obvious disadvantage of depending on the inertia of the platform and is thus relatively inefficient, since it is sensitive to horizontal motion of the water surface.

In a related apparatus, developed by the present inventor and described in U.S. Pat. No. 3,783,302, an expandable and flexible coil is supported on one end by a platform which reciprocates in response to the wave motion across the surface of a body of water. A magnetic field is provided through the coil so that an electromotive force is generated therein due to the relative motion between the coil and the magnetic field.

SUMMARY OF THE INVENTION

The invention concerns a device for generating an electromotive force which utilizes the wave motion across the surface of a body of water. The device comprises a frame which is fixed with respect to the wave motion of the surface of the water and a flotation element, buoyantly supported by the water, for following only the vertical motion of the surface of the water. A pivot arm to amplify the wave motion is attached to the flotation element and rotates about a first pivot axis associated with the frame. An electrical generating means is also associated with the frame and the pivot arm for generating an electromotive force from the relative motion between the frame and the flotation means.

The electrical generating means is stationary with respect to the pivot arm and comprises a plurality of discrete coils arranged so that a reciprocating movement of the pivot arm causes a magnetized armature to move in and out of the coils thereby generating electrical voltage in the coils. To maintain the movement of the pivot arm uniform as the average level of the body of water may change with the tides, a novel means for raising and lowering the generating means with respect to the fixed frame is provided. The generating means and pivot axis are mounted on a subframe which may be raised and lowered with respect to the fixed frame by a lead screw and motor drive apparatus. In accordance with the invention, the voltages developed in each of the coils are to be essentially equal. When the position of the pivot arm relative to the fixed frame changes with a rise or fall of the tide, these voltages will become unequal. Sensing means is provided to sense such inequalities and utilized to control the motor drive apparatus to appropriately raise or lower the subframe to maintain equal voltage.

It is therefore a principal object of the invention to provide a fixed-platform system capable of producing large amounts of electrical energy from the wave motion across the surface of a body of water.

It is another object of the invention to provide a system for generating electrical energy from wave motion utilizing a frame fixed with respect to the earth for high efficiency.

It is still another object of the invention to provide a wave-operated electrical generation system having a fixed frame that automatically compensates for changes in average water level due to tides or other factors.

Other objects, features and advantages of the present invention will be apparent from a study of the written description and the drawings.

BRIEF DESCRIPTION OF THE DRAWINGS

FIG. 3 is a sectioned frontal view of a second embodiment of the electrical generating means of the invention; and FIG. 4 is a sectioned frontal view of a third embodiment of the electrical generating means of the invention.

DESCRIPTION OF THE PREFERRED EMBODIMENT

Figure 1:
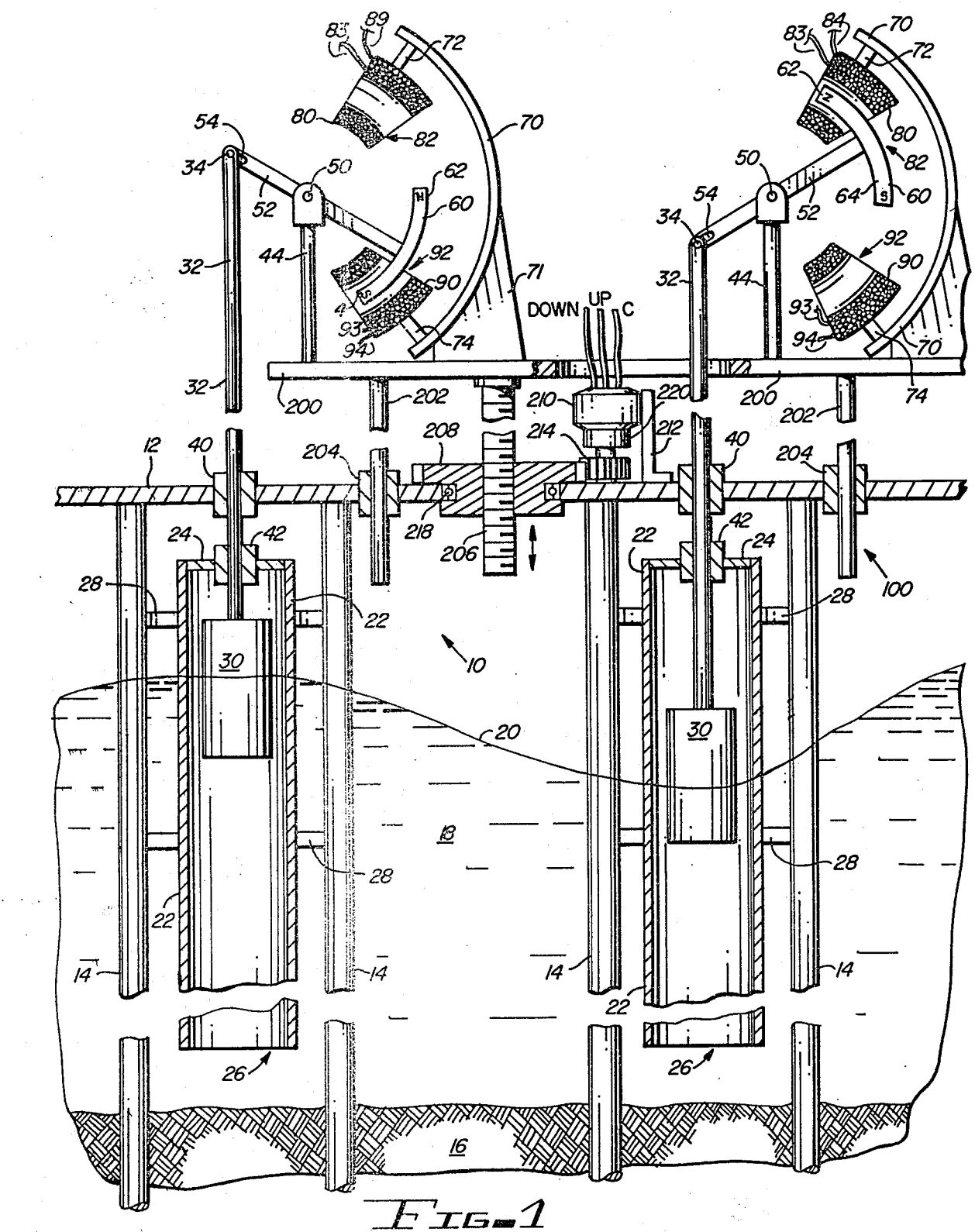
FIG. 1 is a frontal section of one embodiment of the present invention.

An apparatus embodying the present invention is shown in FIG. 1, and described with reference thereto. A wave operated electrical generator, generally referred to as 10, includes a horizontal frame 12 and vertical support elements 14 attached thereto. The distal ends of vertical support elements 14 are fixed with respect to the surface, as by being firmly anchored by ordinary means in a floor of the geographic basin 16 which contains the body of water 18, for example. The wave energy in the body of water 18 will then cause the surface 20 thereof to undulate in a substantially periodic pattern which produces wave crests and wave troughs. The height of vertical support elements 14 is predetermined to allow frame horizontal surface 12 to maintain a safe clearance from the highest wave crests which would be expected in storm conditions and high tides. Multiple vertical support elements 14 are grouped around a cylindrical void 26 which opens at the bottom end of shield 22 to allow the entry of water 18. Shield 22 is attached to vertical support elements 14 of frame 12 by multiple support members 28. The length of shield 22 is selected in accordance with the maximum variations in waves and tides.

A float 30 is buoyantly supported by water 18 near the surface 20 thereof, within the cylindrical void 26 of shield 22. Float 30 has a clearance fit within the internal void 26 of float 22. It should be noted at this point that while the cylindrical form was chosen for float 30 and shield 22, other solid shapes are anticipated to be within the scope of this invention. In any event, it would be anticipated that due to hydrodynamic considerations complementary shapes for float 30 and shield 22 would be chosen to prevent excessive water turbulence therebetween which could adversely affect the efficiency of the wave operated electrical generator. A top 24 of cylindrical shield 22 has multiple openings to prevent air which may be trapped within the cylindrical void 26 from being pressurized, thereby reducing the efficiency of the wave operated electrical generator. A float shaft 32 is vertically attached to the float 30. The float shaft 32 slidably communicates through a first bearing 40 which is attached to frame 12. The float shaft 32 also slidably communicates through a second bearing 42 which is attached to the top 24 of the cylindrical shield 22. The first bearing 40 and the second bearing 42 are designed to efficiently allow the passage of the float shaft 32 therethrough, while at the same time restricting any non-vertical motion of the float 32 within the cylindrical void 26 of the shield 22.

A pivotal support element 44 is vertically attached to a subframe 200 maintained horizontal by vertical members 202 and supported by lead screw 206. Vertical members 202 project through frame surface 12 via bushings 204, permitting subframe 200 to be raised and lowered by lead screw 206 as will be discussed in detail hereinafter. A first pivot shaft 50 is located at the distal extremity of the pivotal support element 44 and provides a first pivot axis for the rotation of a pivot lever arm 52. The first pivotal shaft 50 communicates through and rotatably attaches pivot arm 52 to the pivotal support element 44. One end of pivot arm 52 is movably attached to the float shaft 32. A first pivot pin 34 communicates through the distal end of the flotation shaft 32 in a direction parallel to the first pivot shaft 50. The pivot pin 34 slightly moves within an elongated void 54 at the first distal end of the pivot arm 52, thereby transferring the vertical motion of the shaft 32 into a larger rotational motion of the pivot arm 52 about the first pivot shaft 50.

It is to be noted that pivot arm 52 provides leverage action with respect to its second distal end, thereby in effect multiplying the vertical distance of motion of float 30 to a greater arcuate motion at the second distal end. An arcuate, magnetic flux producing device 60 is attached to a second distal end of the pivot arm 52. At this point it should be understood that while a permanent magnet is illustrated in FIG. 1 as being the means for producing the magnetic flux, an armature consisting of a coil of wire driven by an electrical current could easily be substituted for the permanent magnet. The permanent magnet 60 has a first pole 62 (north) and a second pole 64 (south) located at the distal ends thereof. The arcuate form of magnet 60 has a radius of curvature equal to the length of the pivot arm 52 located between the first pivot shaft 50 and the point of attachment of the magnet 60 to the pivot arm 52.

An arcuate mounting element 70 has the lower end thereof attached to the subframe surface 200. A support element 71 adds further strength to the arcuate mounting element 70 by connecting the center section thereof to the subframe surface 200. The arcuate mounting element 70 is positioned such that the first pivot shaft 50 is located at the center of a circle of which the arcuate mounting element is a section thereof. A first coil 80, having a substantially cylindrical shape with a substantially cylindrical, coaxial void 82 therethrough, is attached to the arcuate mounting element 70 by a coil mounting element 72. A second coil 90, having a substantially cylindrical form with a substantially cylindrical, coaxial void 92 therethrough, is likewise mounted to the arcuate mounting element 70 by coil mounting element 74.

Coils 80 and 90 are mounted along the circumference of a circle having a radius described by the distance measured along the pivot arm 52 between the first pivot shaft 50 and the arcuate magnet 60. The axis of the coil 90 and the cylindrical void 92 located therein are slightly curved to correspond to the arc described by the penetration of the pole piece 64 of the arcuate magnet 60 as it rotates on the pivot arm 52 about the first pivot shaft 50. The axis of the coil 80 and the cylindrical void 82 located therein are slightly curved to correspond to the arc described by the penetration of pole piece 62 of arcuate magnet 60 as it rotates on pivot arm 52 about the first pivot shaft 50. The location of the first coil 80 and the second coil 90 may be adjusted by varying the position of the coil mounting elements 72 and 74 to provide a clearance fit for the pole 62 within the cylindrical void 82 of the coil 80, and a clearance fit for the pole 64 within the cylindrical void 92 of the coil 90.

Circuit means, such as conductors 83 and 84 which are connected to the coil 80, and conductors 93 and 94 which are connected to the coil 90, are connected to an electrical load (not shown).

The angular separation between the coil 80 and the coil 90, when measured about the first pivot shaft 50, is determined by the expected difference between the height of a wave crest and a wave trough of the water surface 20. With reference to the first wave operated electrical generator 10 in FIG. 1, the float 30 is buoyantly supported at a wave crest near the surface 20 of the body of water 18. At this position the pole 64 of the arcuate magnet 60 has fully penetrated the void 92 of the coil 90 without the pivot arm 52 contacting the edge of the coil 90. As illustrated by a second wave operated electrical generator 100 in FIG. 1, the float 30 is buoyantly supported by a wave trough at the surface 20 of the body of water 18. Under these conditions the pole 62 of the arcuate magnet 60 has fully penetrated the cylindrical void 82 of the coil 80 without the pivot arm 52 contacting the edge surface of the coil 80.

Several different methods are envisioned for adjusting the relevant positions of the coils 80 and 90 with respect to the poles 62 and 64 of the arcuate magnet 60 as it pivots about the first pivot shaft 50 in response to wave crests and wave troughs of varying heights. A first method of effecting this adjustment would involve the displacement of the coils 80 and 90 by moving the corresponding coil mounting elements 72 and 74 along the arcuate mounting element 70 to correspond to the maximum arc swept by the pivot arm 52 as it periodically responds to the movement of the float 30 as it is buoyantly supported by wave crests and wave troughs. A second method of effecting this adjustment involves the movement of the pivot pin 34 linearly along the length of the first end of the pivot arm 52 within the elongated void 54. This second method would obviously involve a redesign of the float shaft 32 and the first end of pivot arm 52, but would have the advantage of allowing the coils 80 and 90 to remain fixed on the arcuate mounting element 70. A mechanical brake could also be attached to the float shaft 32 or to the pivot arm 52 for positively limiting the angular excursion of pivot arm 52.

An additional weight may be added to any of the moving elements of this invention so that the combined weight of the float 30 and the float shaft 32 would counterbalance the weight of arcuate magnet structure 60. This condition would allow the most efficient transfer of energy from the waves to the float 30.

The apparatus of FIG. 1 functions in the following manner. As waves pass underneath the horizontal base member 12, the water level in shield 22 will commensurately rise and fall, generally in a periodic manner. As the water level in the shield 22 rises and falls, the float 30, which is buoyantly supported thereby, and float shaft 32 attached thereto, reciprocate up and down within the shield. In this manner the vertical element of the wave motion is employed to impart a reciprocal motion to float shaft 32. This vertical linear motion is transformed into an angular displacement of the arcuate magnet 60 by the rotation of the pivot arm 52 about the first pivot shaft 50 caused by the coupling of the float shaft 32 to the distal end of the pivot arm 52. This reciprocal angular displacement causes pole 62 to alternately penetrate within, and then withdraw from, the cylindrical void 82 of the coil 80. Similarly, the pole 64 of the arcuate magnet 60 alternately penetrates within and withdraws from the cylindrical void 92 of the coil 90. It is a well recognized law of physics that the lines of magnetic flux surrounding the poles 62 and 64 of the arcuate magnet 60 will be periodically cut by the electricity conductive wires forming the coils 80 and 90, thus producing an electrical voltage across the outputs 83 and 84 of coil 80, and the outputs 93 and 94 of coil 90. Of course, the output waveforms produced by the relative motion between the arcuate magnet 60 and the coils 80 and 90 will depend on such factors as the shape of the magnet poles 62 and 64, the distribution of magnetic lines of flux about these poles, the shape and method of winding the electrically conductive wires into the coils 80 and 90, the spacing between the poles of the arcuate magnet 60 and the electrically conductive wires forming the coils 80 and 90, and the instantaneous velocity of the poles of the arcuate maget 60 as they penetrate within and withdraw from the coils 80 and 90. An increase in the velocity of the poles into and out of the coils is obtained by an increase in the radius of the motion of the arcuate magnet 60. This increase in relative velocity of the magnet and the coils increase the e.m.f. produced.

When float 30 is buoyantly supported by a wave crest, as shown in FIG. 1 by the wave operated electrical generator 10, the pole 64 of the arcuate magnet 60 will fully penetrate the void 92 of the coil 90. As the water level within the shield 22 begins to fall due to the passage of the wave crest, the earth's gravitational forces and the loss of buoyant support will cause the float 30 to follow the surface 20 of the body of water 18. Float 30 will periodically fall to a minimum level, as shown by the second wave operated electrical generator 100, at a time when a wave trough passes the shield 22. This vertical displacement causes the pole 62 of arcuate magnet 60 to penetrate within the cylindrical void 82 of the coil 80.

It will of course be understood that when the magnetic poles of the arcuate magnet 60 penetrate within the voids of their respective coils, a voltage will be produced across the leads of that coil. As taught by a well-known law of physics, the electromotive force (emf) generated across the leads of a coil when a magnet penetrates therein may be calculated as follows:

$$E = blv$$

where:
 E = electromotive force in volts
 b = flux density
 l = length of the coil segment being cut by
 v = velocity of the relative movement between the magnetic field and the coil segment.

Coils 80 and 90 will each produce a voltage across their respective leads which will produce an alternating current in a lead connected thereto. The frequency of the ac will depend on the rate of penetration and withdrawal of the magnetic flux source 60. It is generally desirable to connect coils 80 and 90 in series aiding to increase the output voltage. As may be seen, when the flux source 60 is penetrating coils 80 and 90 equally with its reciprocation, the voltage outputs will be equal. For water subject to tidal forces the height of crests and valleys of the waves with respect to the basin floor 16 will change through the tidal cycles. This action, if not compensated, would cause variations in penetration between coils since the neutral position of arm 52 would vary. Additionally, problems in interference of the coils with arm 52 would occur. Therefore, it is necessary to maintain equal penetration and the neutral position of arm 52 constant regardless of tide conditions. Movable subframe 200 is thus provided to permit the active portions of the wave generator to be raised and lowered as the average water height changes.

Referring again to FIG. 1, fixed horizontal frame surface 12 contains bearing 218 for mounting lead screw driving gear 208. Gear 208 has an internal thread through its center mating with the threads of lead screw 206. Gear 208 is driven by spur gear 214 by reversible electric motor 210 mounted on horizontal frame 12. A gear box 220 may be used to reduce the motor speed since only a gradual and slow adjustment of subframe 200 is required. As the tide falls, the DOWN leads of motor 210 are energized, causing the lead screw 206 to rotate so as to lower the active wave generator assembly, maintaining the float in its proper relationship to coils 80 and 90. Similarly, with a rising tide, the UP leads of motor 210 are powered, causing lead screw 206 to raise subframe 200. A control circuit, described below, causes the motor to stop when the correct height of subframe 200 is achieved. Although the adjustable subframe 200 has been described for exemplary purposes, there are obviously many alternative approaches. For example, coils 80 and 90 could be fixed and the length of float rod 32 varied to effect compensation.

Similarly, arcuate coil support 70 would be movable about the pivot point 50 to follow offsets of flux source 60. Although an electric drive motor is disclosed, use of hydraulics, compressed gases, or other actuating means is equally applicable. These and other methods are considered to be within the scope of the invention.

Figure 2:
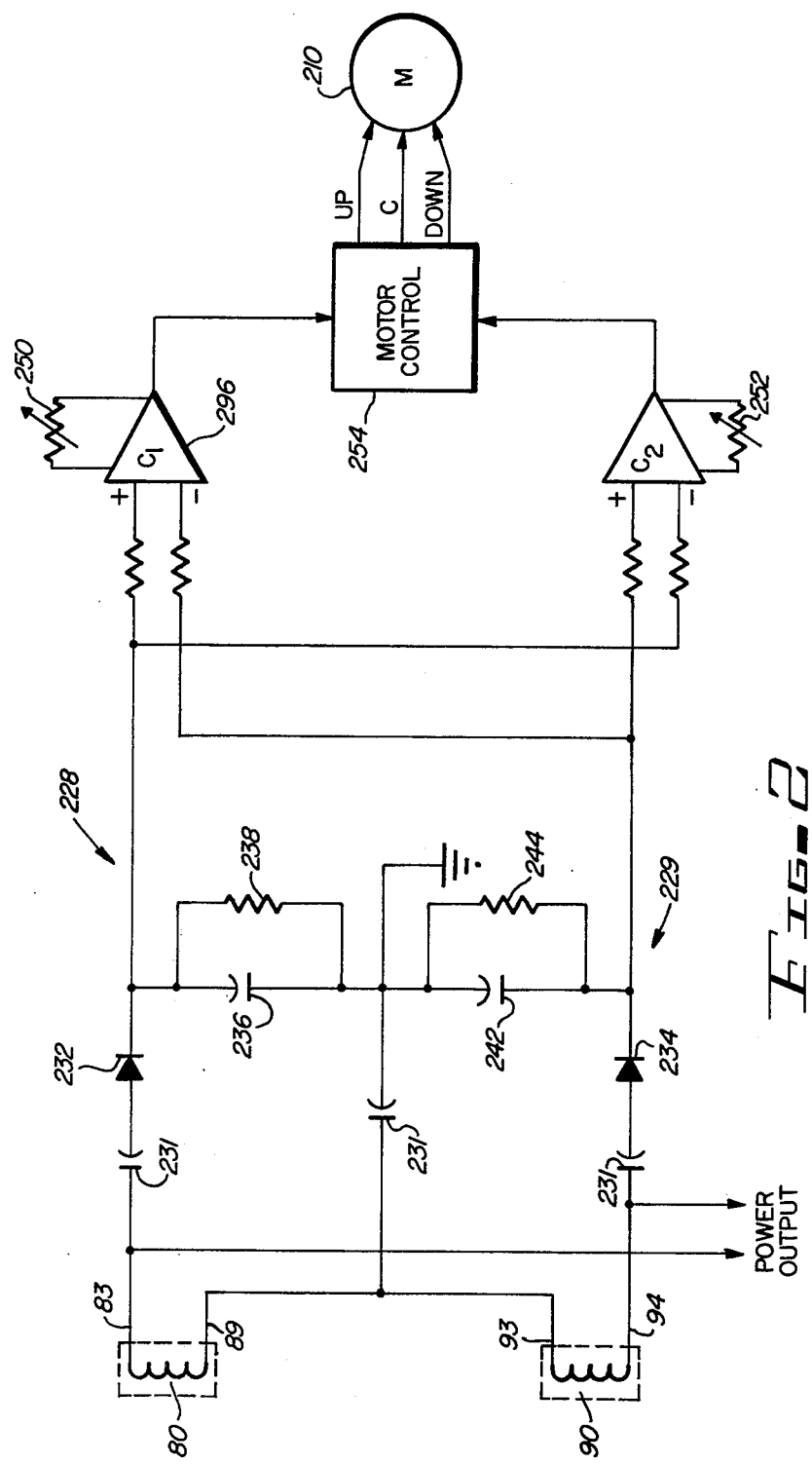
FIG. 2 is a functional block diagram of a control system for compensating the embodiment of FIG. 1 when changes occur due to tides.

In FIG. 2, a functional block diagram of a control system 230 is shown which will control the tide compensation apparatus described above to properly maintain the neutral position of pivot arm 52 centered between coils 80 and 90. A signal is required representative of the average water level disregarding the continually changing wave heights. While many water level sensing and integrating devices are available, a novel and simple sensing means utilizes coils 80 and 90 as sensing elements. Coils 80 and 90 are connected in series aiding with respect to the output power leads 83 and 94 as shown. The output voltage is then the vector sum of the ac voltages across coil 80 and coil 90. When the flux source 60 is properly centered with respect to coils 80 and 90, the voltages from the two coils will be essentially equal. However, with a change in average water level, flux source 60 will be biased or shifted toward one of the coils, say coil 80 for example, and the voltage across coil 80 will be higher than across coil 90 due to the unequal penetration. Control system 230 makes use of this voltage difference.

A dc rectifier circuit 228 is connected across coil 80 through blocking capacitors 231, comprising rectifier 232, capacitor 236 and 238. An identical circuit 229 with rectifier 234, capacitor 242 and resistor 244 is connected across coil 90 with a common ground for the two rectifier circuits. Using the circuit across coil 80 as an example, a dc voltage will appear across capacitor 236 which tends to be discharged by resistor 238. By selecting the RC time constant to be on the order of five times the period of the ac voltage from coil 80, a dc voltage will be produced directly proportional to the magnitude of the voltage generated in coil 80. Thus, the time constant may be easily adjusted for the wave periods experienced in a particular geographic location. For illustration, Sevendrup, Johnson and Fleming have reported in THE OCEANS that a typical observed period for South Atlantic Ocean waves is 9.5 seconds. A time constant of 45–50 seconds would therefore be suitable for such waves. The rectifier circuit for coil 90 operates in the same fashion. Two comparators 236, 248 are utilized to determine if a difference in voltage between coils 80 and 90 has occurred. Comparator 246($C_1$) uses the output of the coil 80 rectifier at its signal input and from the coil 90 for its reference input. When the voltage from coil 80 is greater than the voltage from coil 90, a logic ONE will appear at the output of comparator 246. Comparator 248($C_2$) is oppositely connected and will produce a logic ZERO under the above conditions. When the coil 90 voltage is high, comparator 248 produces a logic ONE and comparator 236 a logic ZERO. The logic signal lines are connected to a conventional motor control circuit 254, which operates motor 210 to move subframe 100 up or down as required. Assume that the tide has lowered, resulting in unbalance of arm 52 in FIG. 1 toward coil 80, which then produces a greater voltage than coil 90. A ONE will occur at the output of comparator 246 and motor control 254 will energize the UP winding of motor 210 resulting in raising of subframe 200. The rate of raising is selected to be very slow compared with the wave period. As the average voltages measured by the rectifier circuits 228 and 229 become equal, the output from comparator 246 switches to ZERO, stopping motor 210. The opposite action will take place if the tide is rising, with comparator 248 producing a ONE, energizing the UP winding of motor 210. To prevent overshoot and hunting of the system, it is desirable to offset the point at which comparators 246 and 248 operate, creating a small "dead zone." This is accomplished with adjustable offset controls 250 and 252. Rather than producing a ONE when one input voltage just exceeds the reference voltage, the comparators require a selected difference to operate. Thus, the system 230 will periodically adjust the height of subbase 200 as the tides change with time. The following chart summarizes the operation of the control system:

| COIL VOLTAGE CONDITION | $C_1$ OUTPUT | $C_2$ OUTPUT | MOTOR |
|---|---|---|---|
| $V_{80}$ greater than $V_{90}$ by selected offset | ONE | ZERO | UP |
| $V_{90}$ greater than $V_{80}$ by selected offset | ZERO | ONE | DOWN |
| $V_{80}$ and $V_{90}$ equal within selected offset | ZERO | ZERO | OFF |

As shown in FIG. 3, a portion of a second embodiment of the invention includes an apparatus 110 which is essentially similar to that previously described except that three magnetic poles are included at either end of the arcuate magnet structure 112. A w-shaped permanent magnet has similar poles 114 and 118 flanking a dissimilar pole 116. This arrangement of magnetic poles increases the density of the magnetic flux lines communicating therebetween, and consequently increases the output voltage when the coil 80 penetrates the area of increased magnetic flux density. The magnetic pole 116 penetrates within the cylindrical void 82 of the coil 80, while the poles 114 and 118 move along the external surface of the coil. The periodic movement of the magnetic structure 112 and the attached pivot arm 52 about the first pivot shaft 50 in response to the vertical movement of the float shaft 32 is the same as was previously described. Of course, a w-shaped (or double U-shaped) electromagnet may be substituted for the permanent bar magnet as shown in FIG. 8.

As shown in FIG. 4, a portion of a third embodiment of the invention includes an apparatus 130 which is essentially similar to that previously described except that the position of the flux means and the coil means are reversed. A generally cylindrically shaped coil 140, having a generally cylindrically shaped coaxial void 142 therein, is attached at the distal end of pivot arm 52. Two w-shaped bar magnets 150 and 160 are placed in the same relative position as the coils in the previously described invention, whereby a magnetic pole 154 of magnet 150 penetrates within the cylindrical void 142 of the coil 140 and poles 152 and 156 follow along the outside surface thereof. Similarly, a pole 164 penetrates within the void 142 of the coil 140 during the opposite half of the cyclical movement thereof. Of course, the axis of the cylindrical coil 140, and the cylindrical void 142 coaxially located therein, are curved to follow the arc swept by the distal end of the pivot arm 52 as it rotates about the first pivot shaft 50. To utilize the height control system 230 of FIG. 2, coil 140 is tapped at its electrical center, and the two halves used for control comparison purposes.

It will be clear at this point that a wave-operated electrical generator has been disclosed that may be fixed with reference to the geographic basin and therefore may be highly efficient, and has means for correcting changes in the generator output with tidal variations. However, the invention is not to be construed as limited to the particular forms disclosed herein, since these are to be regarded as illustrative rather than restrictive.

I claim:

1. A system for converting the mechanical energy in the wave motion of a body of water into electrical energy comprising in combination:

a frame being fixed with respect to said wave motion of said water;

flotation means buoyantly supported by said water, for following said wave motion;

a subframe attached to said frame and movable in the vertical plane with respect thereto;

a first pivot shaft supported by said subframe;

a pivot arm attached to said flotation means, with said pivot arm rotatable about said first pivot shaft;

means including means for generating magnetic flux and electrical conductor means coupled to said subframe and said pivot arm for generating electrical voltages from the relative motion therebetween, said magnetic flux means comprising at least one magnet having a pair of poles, and said electrical conductor means comprises a pair of essentially cylindrical coils of electrically conducting cable, each of said coils having a cylindrical coaxial void therethrough, said coils being arranged such that one pole of said magnet is penetrating the void of one of said coils while the other pole of said magnet is withdrawing from the void of the other one of said coils;

voltage comparison means connected to said pair of coils for producing a control signal when the voltages across said pair of coils are not equal; and subframe positioning means connected to said subframe and to said voltage comparison means, said positioning means responsive to such control signal for vertically positioning said subframe relative to said flotation means so as to produce essentially equal electrical energy from each one of said pair of coils.

2. A device for generating an electromotive force by utilizing the wave motion on the surface of a body of water, comprising in combination:

a frame fixed with respect to the wave motion of the surface of the water;

flotation means buoyantly supported by the water near the surface thereof for following the wave motion of the surface;

a pivot shaft supported by said frame;

a pivot arm disposed on said pivot shaft having a first end pivotally coupled to said flotation means and a second end adapted to move in an arcuate path in response to vertical movement of said flotation means;

a pair of electrical coils, each having an arcuate clyindrical void therethrough, said pair of coils mounted to said frame with the arcuate axes of said voids forming an arc and with an angular separation therebetween preselected to be proportional to the expected difference between the height of a wave crest and the depth of a wave trough on the surface of the water;

an arcuate magnetic flux producing means symmetrically attached to said second end of said pivot arm between said pair of coils matching and aligned with said arcuate axis and in position to cause a first pole of said magnetic flux producing means to penetrate through the void of one coil of said pair when said flotation means is at the crest of a wave and to cause a second pole of said magnetic flux producing means to penetrate through the void of the other coil of said pair when said flotation means is at the trough of a wave, said magnetic flux producing means and said coils being arranged such that one pole of said magnetic flux producing means is penetrating said void of one of said pair while the other pole of said magnetic flux producing means is withdrawing from said void of the other one of said pair; and control means controlling said magnetic flux producing means and said coils relative to the average depth of the water such that the arcuate movement of said magnetic flux producing means is symmetrical with respect to said voids of said coils.

3. The device as described in claim 2 in which said magnetic flux producing means is a bar type magnet.

4. The device as described in claim 2 in which said magnetic flux producing means is an electromagnet.

5. The device as described in claim 2 in which said flotation means includes a vertical shaft having bearing means attached to said frame for constraining said flotation means to move only in a vertical direction.

6. The device as described in claim 2 which further comprises vertical controlling means for controlling said flotation means to follow only the vertical component of the wave motion of the surface of the water.

7. The device as described in claim 6 in which said vertical controlling means comprises a shield attached to said frame and surrounding said flotation means for shielding said flotation means from any horizontal component of the wave motion of the surface of the water.

8. The device as described in claim 2 in which said control means comprises:

a vertically movable portion of said frame having said pivot means and said pair of electrical coils supported thereon;

drive means for moving said movable portion vertically;

average water level sensing means for producing a control signal when a change occurs in the average depth of the body of water; and drive control means responsive to such signal for energizing said drive means to move said movable portion in a direction for a distance essentially equal to the change in average depth of the body of water.

9. The device as defined in claim 8 in which said water level sensing means includes comparator means for comparing the output voltage produced by one of said coils to the output voltage produced by the other of said coils in response to the movement of said flux producing means through said void of said coils, and said drive control means is connected to said comparator means adapted to energize said drive means in response to such signal to move said movable portion of said frame in a direction and for a distance to equalize the voltages across said pair of coils.

10. The device as defined in claim 9 in which said drive means is a reversible electrical motor adapted to move said movable portion of said frame in either the up or down direction.

* * * * *